H. SCHWARTING.
HAND TWINE CUTTER.
APPLICATION FILED MAR. 1, 1920.
1,398,919.
Patented Nov. 29, 1921.
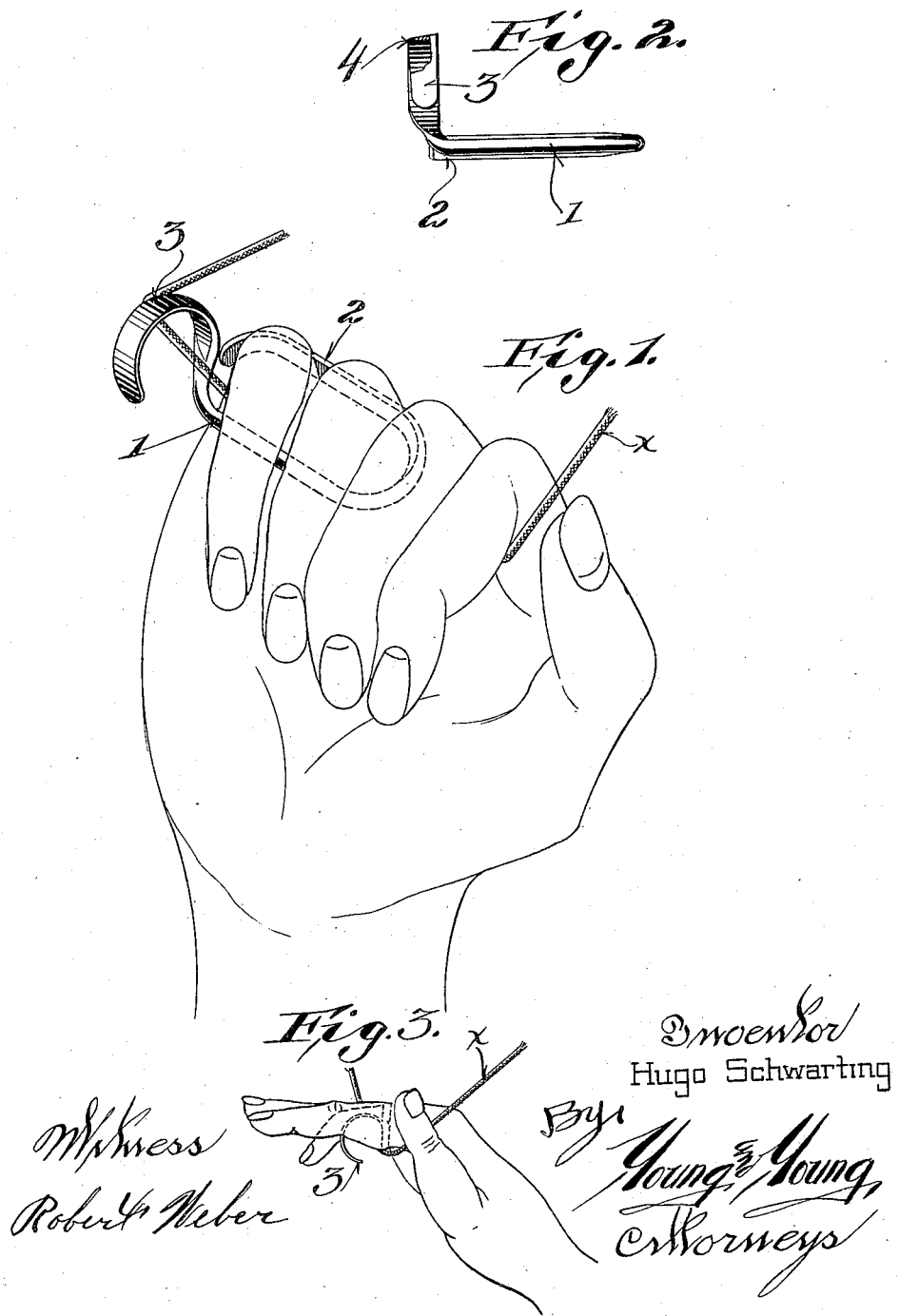
Inventor
Hugo Schwarting

UNITED STATES PATENT OFFICE.

HUGO SCHWARTING, OF GREEN BAY, WISCONSIN.

HAND TWINE-CUTTER.

1,398,919.  Specification of Letters Patent.  Patented Nov. 29, 1921.

Application filed March 1, 1920. Serial No. 362,313.

*To all whom it may concern:*

Be it known that I, HUGO SCHWARTING, a citizen of the United States, and resident of Green Bay, in the county of Brown and State of Wisconsin, have invented certain new and useful Improvements in Hand Twine-Cutters; and I do hereby declare that the following is a full, clear, and exact description thereof.

The object of my invention is to provide a simple economical and effective twine cutter which can be readily fitted to the hand of an operator in such manner that the hooked knife is conveniently positioned just beyond the little finger so as to envelop or catch a cord as it would naturally run through the grip of a person manipulating the same whereby the cord is severed incidental to strain put upon it in the ordinary manner to break the cord or twine. Hence it will be seen that the twine cutter will sever the same and avoid the inconvenience of breaking such cord in the ordinary manner which usually results in cutting the fingers due to pull strain upon said cord.

Specific objects of my invention are:

To provide a twine cutter having a hooked blade and looped handle for encircling two or more fingers whereby the knife is held firmly in its cutting position.

To position the hooked knife at an approximate right angle to the finger loop and in a forwardly curved position with relation to the little finger paralleling the same, to thus function as an auxiliary cutting finger.

With the above objects in view the invention consists in certain peculiarities of construction and combination of parts as will be hereinafter set forth with reference to the accompanying illustrations and subsequently claimed.

In the accompanying drawings:

Figure 1 represents a perspective view of a hand having fitted thereto a twine cutter embodying the essential features of my invention.

Fig. 2 is a side elevational view of the twine cutter with parts broken away to illustrate certain details, and Fig. 3 is a diagrammatic view of a hand showing the position of the hooked twine cutter with relation to the fingers and palm.

Referring by character to the drawing, 1 represents the palm stretch of a finger loop the same being preferably rounded so as to offer a smooth surface to the palm of the hand and fingers when the hand is closed and 2 represents the outer stretch of the loop which stretch is preferably flat so as to prevent more or less wabble of the twine cutter when the same is slipped over the little and second finger as shown in Fig. 1 of the drawings.

The palm stretch 1 is merged into a forwardly curved hooked-blade 3 that is adapted to approximately parallel the little finger when the same is closed. The hooked-blade being formed with an open loop for the reception of a cord to be cut and having its outer edge sharpened as at 4 to constitute a cutting blade throughout the circular area of said hook.

As best shown in Fig. 3 the hooked-blade assumes a position corresponding somewhat to the little finger when it is folded coincident to the hand being closed to grip upon a cord marked $x$ in said figure and also in Fig. 1.

From the foregoing description it is manifest that the operator has the free use of his hand to tie a bundle or to perform other functions such as serving customers or the like and in performing these functions the cutter is in no way an obstruction to the free use of the hand. After the operator has manipulated the twine $x$ to tie a bundle, in pulling the twine taut by gripping it in the closed palm, the end portion of twine which passes beyond the little finger will be guided through the hooked-blade and when strain is put upon the twine this blade will sever the same close to the little finger.

While I have shown and described the twine cutter loop minutely as to detail it is understood that said loop may be made in various forms without departing from the spirit of my invention the essential feature of which is the arrangement whereby the hooked-blade is positioned closely to the little finger and inclined outwardly with relation to the end of the same so as to insure the cord which passes through the closed palm, being cut.

I claim:

As a new article of manufacture, a one-piece twine cutter comprising a loop adapted to be fitted over the little finger and one or more adjacent fingers, the palm stretch of the loop being circular in cross section, and the outer stretch thereof being flat in cross section to thereby prevent wabble of the loop, a flat hooked-blade extending from the loop approximately parallel to the little finger and beyond the same to constitute a receiver for a cord that is passed through the closed palm, whereby said cord is severed incidental to a pull strain being put upon it.

In testimony that I claim the foregoing I have hereunto set my hand at Green Bay, in the county of Brown and State of Wisconsin.

HUGO SCHWARTING.